United States Patent
Christie et al.

(10) Patent No.: US 6,955,149 B1
(45) Date of Patent: Oct. 18, 2005

(54) VARIABLE INTAKE MANIFOLD WITH TRIMODE RESONANCE TUNING CONTROL VALVE

(75) Inventors: Mark J. Christie, Northville, MI (US); Richard M. Frank, Beverly Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/911,889

(22) Filed: Aug. 5, 2004

(51) Int. Cl.[7] .............................................. F02M 35/10
(52) U.S. Cl. ........................ 123/184.55; 123/184.36; 123/184.44; 123/184.49
(58) Field of Search ................... 123/184.26, 184.36, 123/184.44, 184.49, 184.53, 184.55, 184.56, 123/184.59

(56) References Cited

U.S. PATENT DOCUMENTS 4,549,506 A * 10/1985 Rush et al. ............ 123/184.53
5,638,785 A    6/1997 Lee ........................ 123/184.35
6,260,528 B1 * 7/2001 Pringle et al. ......... 123/184.53

* cited by examiner

Primary Examiner—Noah P. Kamen
(74) Attorney, Agent, or Firm—Christopher DeVries

(57) ABSTRACT

A simplified variable intake manifold is disclosed for use with an internal combustion engine. The manifold utilizes a single valve actuator to vary the resonant frequency of a pair of plenums. The two plenums are joined by first and second communication passages of differing lengths connected to provide cross flow between two plenums. Each plenum has an inlet for receiving intake air from a throttle body and a group of runners adapted for connection with a like group of engine cylinders to direct inlet air from the plenums to combustion chambers of the cylinders. A control valve having an elongated shaft extends through the first and second communication passages and includes separate blades rotatable with the shaft to open or close the passages to provide at least three modes of tuning of the plenums. A stepper motor or other suitable device acts upon the shaft to rotate the blades within the communication passages.

10 Claims, 4 Drawing Sheets ves of the connected volumes. With both passages closed, the separate plenums are tuned to improve low speed torque. Each plenum has an inlet for receiving intake air from a throttle body and a series of runners connecting the plenum with a respective group of cylinders to direct inlet air from the plenum to the combustion chambers of its respective cylinder group.

VARIABLE INTAKE MANIFOLD WITH TRIMODE RESONANCE TUNING CONTROL VALVE

TECHNICAL FIELD

This invention relates to engine air intake manifolds and, more particularly, to air intake manifolds having dual plenums valved to provide three modes of resonance tuning of engine cylinder air charges.

BACKGROUND OF THE INVENTION

A majority of engine air intake manifolds have a fixed volume plenum with fixed length runners tuned for a particular application, such as low rpm torque, midrange torque, or high rpm torque.

Variable geometry intake manifolds provide more than one tuned frequency to optimize engine performance over a wider range of engine rpm. One such variable geometry intake manifold utilizes a pair of plenums connected together by differing length communication passages to vary the tuning and effective volume of the plenums. The communication passages are controlled by separate valves, which selectively open or close their respective communication passages to vary flow between the plenums and thereby alter the effective volume of the plenums. By varying the effective volumes, the resonant frequencies of the manifold can be extended to optimize airflow through the plenums and obtain desired volumetric efficiencies at various engine rpm.

Another type of variable geometry intake manifold uses a fixed volume plenum connected to short and long runners. This manifold also uses multiple valves to vary the geometry of the manifold by switching between two runner lengths. When switched to the longer runner length, the resonant frequency of the intake manifold decreases. This provides additional engine torque at lower engine speeds. When switched to the shorter runner length, the resonant frequency of the intake manifold increases thereby increasing the engine speed where maximum volumetric efficiency occurs. This provides additional engine horsepower at higher engine speeds.

SUMMARY OF THE INVENTION

The present invention provides a simplified variable intake manifold utilizing only one valve actuator for tuning a pair of plenums. The manifold may be used in conjunction with inline or V-type internal combustion engines, having two groups of cylinders. For example, in a V-type engine the cylinders may be grouped by cylinder banks and in an inline engine, the single cylinder bank may be grouped into front and rear halves.

In an exemplary embodiment, an intake manifold designed for a V-type engine includes a pair of plenums joined together by first and second communication passages. These may be alternately opened to provide cross flow between the two plenums or may both be closed to separate the plenum volumes.

The first communication passage, tuned to improve high rpm torque, provides a short, high flow volume connection between the plenums that connects the two plenums into a single large volume plenum connecting with all the engine cylinders. The second communication passage, tuned to improve midrange torque, provides a longer, lower flow volume passage connecting ends of the plenums for tuning the resonance of the connected volumes. With both passages closed, the separate plenums are tuned to improve low speed torque. Each plenum has an inlet for receiving intake air from a throttle body and a series of runners connecting the plenum with a respective group of cylinders to direct inlet air from the plenum to the combustion chambers of its respective cylinder group.

A control valve having an elongated shaft with first and second ends extends into the first and second communication passages. A single stepper motor or other suitable device acts upon the shaft to rotate the shaft within the communication passages. Within the first communication passage, a rotatable valve or blade is mounted on the shaft and is operative to control airflow through the first communication passage. Within the second communication passage, a second rotatable valve or blade is mounted on the shaft and is operative to control airflow through the second communication passage.

If desired, the blades may be angularly offset from one another or the communication passages may be angularly offset so that when the shaft is rotated to a first mode position, the first blade closes the first communication passage and the second blade closes the second communication passage for engine operation in a first mode with enhanced low speed torque. When the shaft is rotated to a second mode position, the first blade closes the first communication passage and the second blade opens the second communication passage for engine operation in a second mode with enhanced mid speed torque. When the shaft is rotated to a third mode position within the communication passages, the first blade opens the first communication passage and the second blade closes the second communication passage for operation of the engine in a third mode with enhanced high speed torque.

If desired, sealing disks or other suitable sealing devices may be installed on the shaft adjacent the blades and the ends of the shaft to prevent air leakage around the shaft and the ends of the blades.

These and other features and advantages of the invention will be more fully understood from the following description of certain specific embodiments of the invention taken together with the accompanying drawings.

DESCRIPTION OF THE PREFERRED EMBODIMENT

Figure 1:
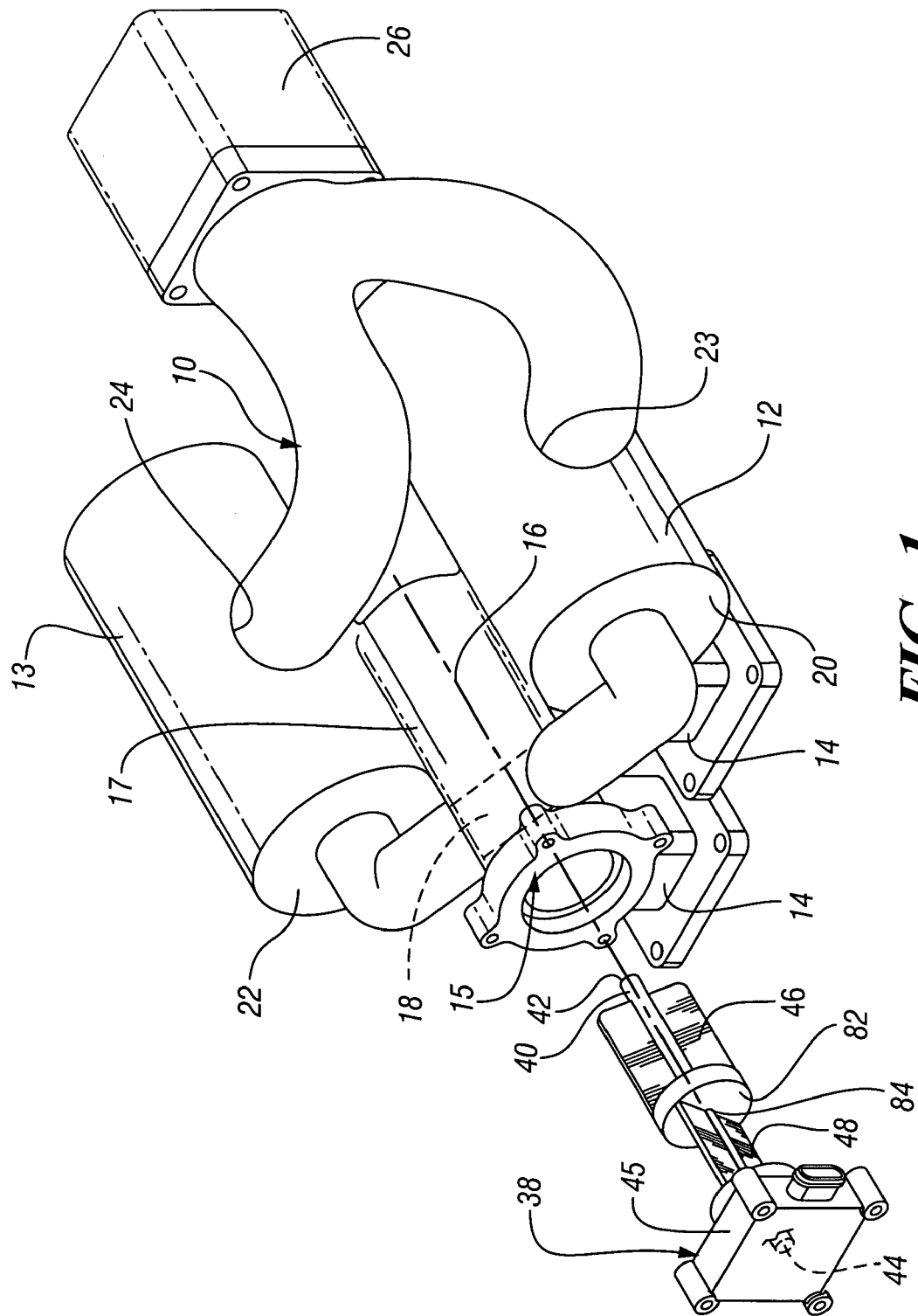
FIG. 1 is an exploded pictorial view of an exemplary intake manifold according to the invention for use with a V-type internal combustion engine.
Figure 2:
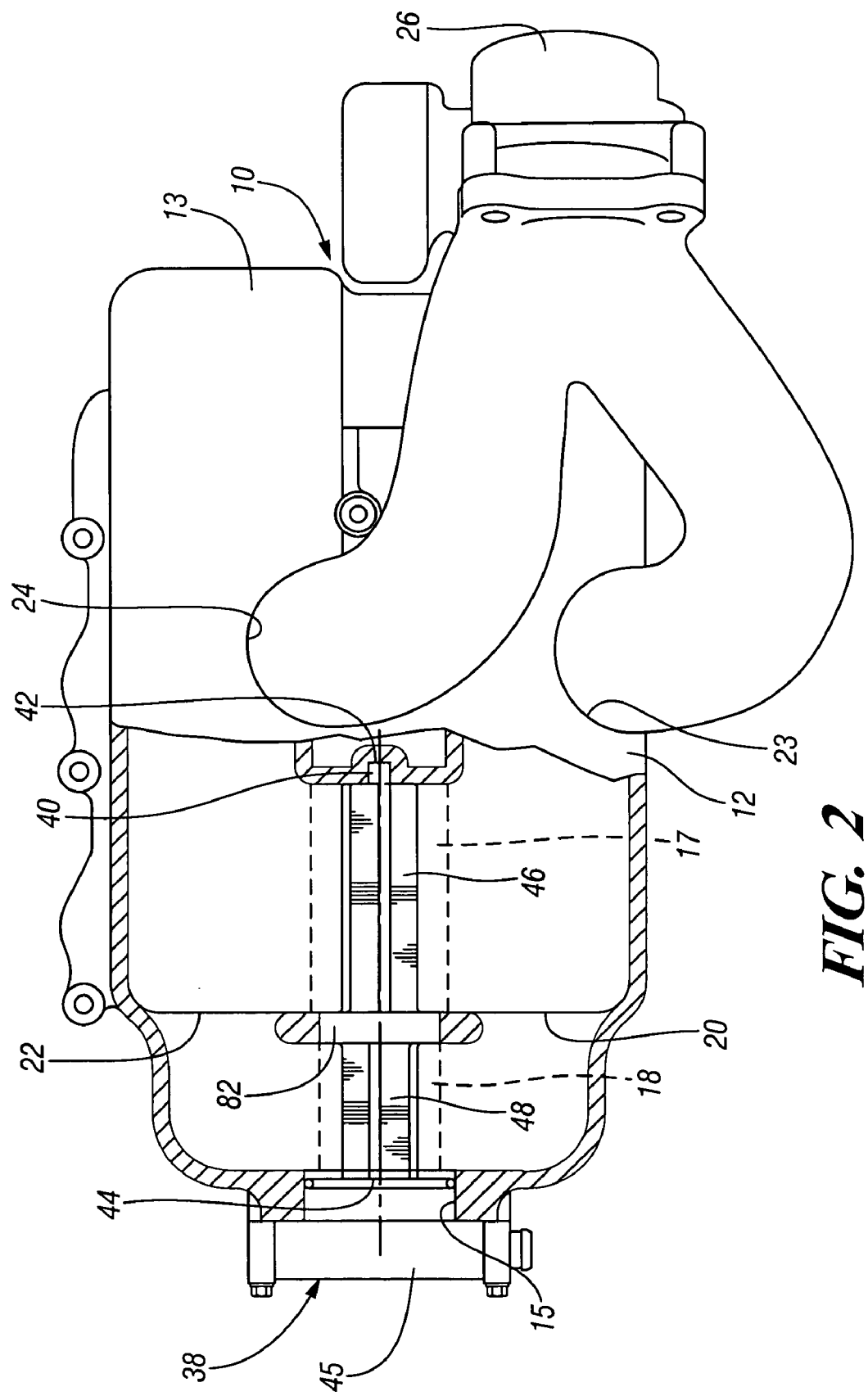
FIG. 2 is a top view of the intake manifold of FIG. 1 cut away to show communication passages between the plenums.

Referring first to FIGS. 1 and 2 of the drawings in detail, numeral 10 generally indicates a simplified variable intake manifold for use with a V-type internal combustion engine, not shown, having two groups of cylinders, each comprising a cylinder bank. The intake manifold 10 includes a pair of longitudinally extending plenums 12, 13 spaced laterally from one another and each connected with multiple runners 14 for connection with associated cylinders of the engine. The plenums are joined by a tubular valve body 15 having a longitudinal axis 16 and first and second communication passages 17, 18, each extending laterally between the two plenums.

The first communication passage 17 extends between adjacent plenums 12, 13 and provides a short, high flow volume connection between the plenums 12, 13 which effectively forms one larger plenum feeding all the runners 14. The second communication passage 18 extends from the ends 20, 22 of the plenums 12, 13 and laterally through the valve body 15 to provide a longer, lower flow volume tuning passage connecting the plenums. The plenums 12, 13 have inlets 23, 24 connected to receive intake air from a throttle body 26. The runners 14 direct the intake air from the plenums 12, 13 to intake ports, not shown, connecting with the cylinders of an associated engine.

Communication between the plenums is controlled by a single control valve 38 shown in FIGS. 1–6. Valve 38 has an elongated shaft 40 with first and second ends 42, 44. The elongated shaft 40 extends into the valve body 15 along its longitudinal axis 16 and across the first and second communication passages 17, 18. An actuator 45 is connected to one end of the elongated shaft and is operable to rotate the valve 38 within the first and second communication passages 17, 18. The actuator 45 may be of any suitable type, for example an electric stepper motor with mechanical gearing, not shown. Within the first communication passage 17, a first blade 46 is carried on the shaft 40 and is operative to control airflow through the first communication passage. Within the second communication passage 18, a second blade 48 is carried on the shaft 40 and is operative to control airflow through the second communication passage. As shown, the first and second communication passages 17, 18 intersect the valve body axis 16 at the axially spaced locations of the valve blades 46, 48 along the shaft 40.

Figure 3:
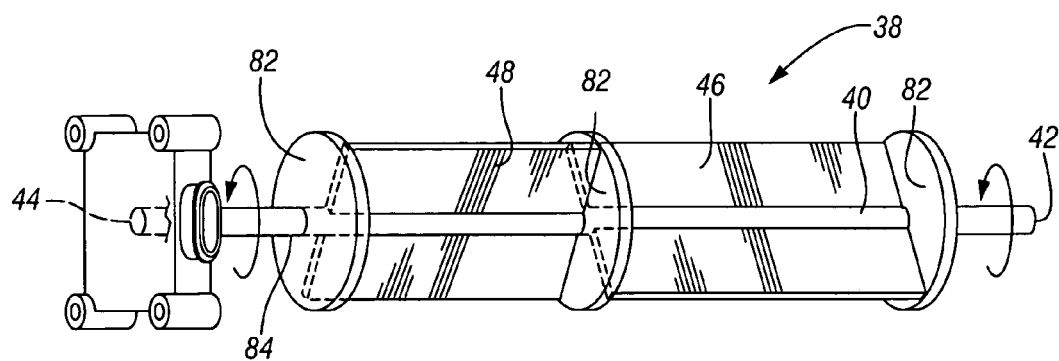
FIG. 3 is a pictorial view of a control valve for use in either FIG. 1 or 2 showing one possible blade configuration.
Figure 4:
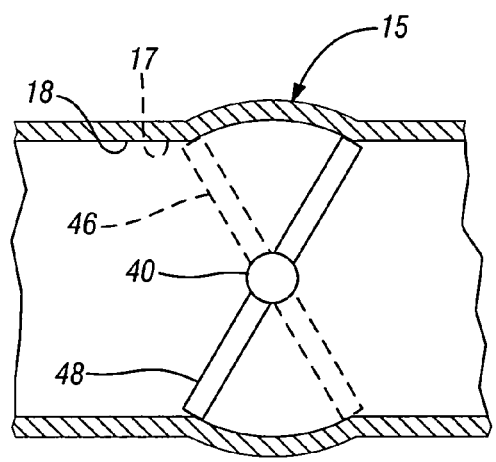
FIG. 4 is a diagram illustrating a control valve in a first mode position, the control valve having angularly offset blades and parallel communication chambers.
Figure 5:
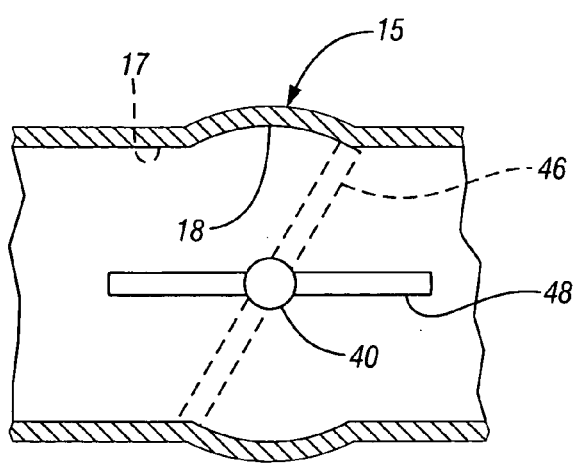
FIG. 5 is a diagram illustrating the control valve of FIG. 5 in a second mode position.
Figure 6:
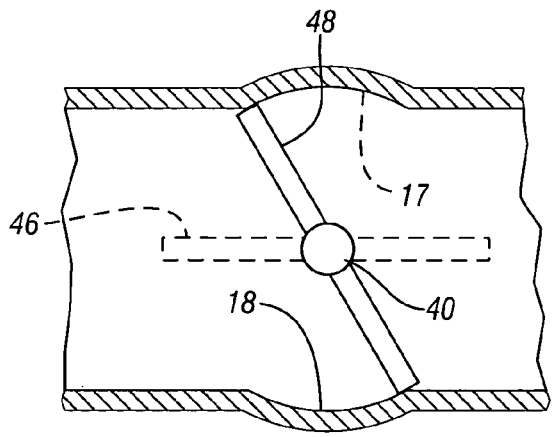
FIG. 6 is a diagram illustrating a the control valve of FIG. 5 in a third mode position.

Preferably, in an exemplary embodiment the blades 46, 48 are angularly offset from one another and the communication passages 17, 18 are parallel to one another as shown in FIGS. 1–6. It should be understood that various blade angle offset combinations and communication passage angle offset combinations are possible for achieving the goal of the claimed invention. In the exemplary embodiment, the blades 46, 48 are angularly offset by 60 degrees so that three modes of operation can be obtained by rotating the control valve 120 degrees. Examples of these operating modes are illustrated in FIGS. 4–6.

FIG. 4 shows the control valve 38 positioned in a first mode position within the communication passages 17, 18 in which the first blade 46 closes the first communication passage 17 and the second blade closes the second communication passage 18. FIG. 5 shows the control valve 38 rotated clockwise 60 degrees to a second mode position in which the first blade 46 still closes the first communication passage 17 but the second blade 48 opens the second communication passage 18 to communicate the plenums through the longer passage 18. FIG. 6 shows valve 38 rotated an additional 60 degrees to a third mode position in which the first blade 46 opens the first communication passage 17 and the second blade 48 closes the second communication passage 18 to communicate the plenums through the short passage 17.

In operation of intake manifold 10 as illustrated in FIGS. 1–3, the engine, not shown, continuously draws inlet air through the intake manifold. As engine speed increases, the volume of air drawn through the intake manifold increases as well as the resonant frequency of the air pulsations. In order to improve volumetric efficiency and increase engine torque output, the resonant frequency of the intake manifold 10 is varied to match that of the engine. More particularly, the resonant frequency in the manifold is determined by plenum volume and wave length which are varied by selectively opening and closing the communication passages 17, 18 between the plenums 12, 13.

During low speed operation, the control valve 38 is disposed in a first mode position, shown in FIG. 4, for low engine speed tuning. In this mode position, the first blade 46 closes the first communication passage 17 while the second blade 48 closes the second communication passage 18. This causes air to flow directly from the inlets 23, 24 of the plenums 13, 14 to the runners 14 of the separate plenums. As a result, the plenums operate independently to improve volumetric efficiency and increase engine torque at lower engine speeds.

As the engine speed increases, the control valve 38 is rotated to the second mode position, as shown in FIG. 5, to alter the tuning of the intake manifold 10. In the second mode position, the first blade 46 closes the first communication passage 17 while the second blade 48 opens the second communication passage 18. This allows pressure waves to travel between the plenums through the longer, end connected, second communication passage, which is tuned for midrange engine rpm. As a result, this tuning of the intake manifold 10 improves the volumetric efficiency and increases engine torque at intermediate speeds.

As the engine speed is further increased, the control valve 38 is further rotated to the third mode position, shown in FIG. 6, to again alter the tuning of the intake manifold 10. In this mode position, the first blade 46 opens the first communication passage 17 while the second blade 48 closes the second communication passage 18. Thus, the two plenums 12, 13 are connected through the shorter communication passage 17, which effectively forms a single larger plenum volume tuned for high engine rpm. As a result, the tuning of the intake manifold 10 improves volumetric efficiency and increases engine torque at higher engine speeds.

Figure 7:
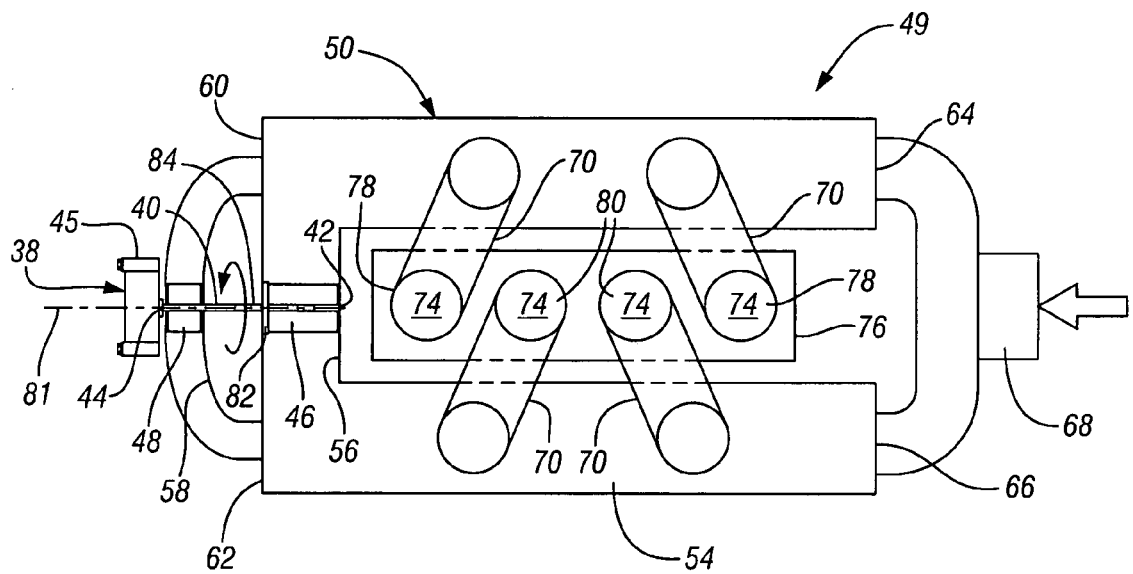
FIG. 7 is a diagrammatic view of an alternative embodiment of an intake manifold adapted for an inline engine according to the present invention.

FIG. 7 illustrates schematically an inline four cylinder engine 49 connected with an alternative embodiment of intake manifold 50 according to the invention. The manifold 50 includes a pair of longitudinally extending, laterally spaced plenums 52, 54 that are joined together by first and second communication passages 56, 58. The first communication passage 56 provides a short, large area passage connecting adjacent ends 60, 62 of the plenums. The second communication passage 58 extends from the ends 60, 62 of the plenums and laterally through the valve body to provide a longer, lower flow volume, tuning passage connecting the plenums, as in the first described embodiment.

The plenums 52, 54 have inlets 64, 66, respectively, connected to receive intake air from a throttle body 68. Four runners 70 direct intake air from the plenums 52, 54 to associated first and second groups 78, 80 of cylinders 74 within a single cylinder bank 76. The first and second groups 78, 80 of cylinders 74 comprise alternately firing cylinder groups. However, it should be understood that the runners 70 and the cylinders 74 may rearranged depending upon the firing order of the cylinders.

The manifold includes a control valve 38 functionally similar to control valve 38 of FIGS. 1–6. Control valve 38 also has an elongated shaft 40 with first and second ends 42, 44 and spaced blades 46, 48. The shaft 40 extends on a longitudinal axis 81 through the first and second axially spaced communication passages 56, 58, which are controlled by blades 46, 48 carried on the shaft at the axially spaced locations of the communication passages 56, 58. An actuator 45 is connected to one end of the shaft 40 to rotate the valve 38 to control communication through the first and second communication passages 56, 58.

The remaining features and operation of the valve are as described previously with respect to the embodiment of FIGS. 1–6.

Thus, intake manifold 50 when installed with an inline engine operates in a manner similar to intake manifold 10 in that the control valve 38 alters air tuning of the manifold 50 to improve volumetric efficiency over a wide range of engine rpm.

It should be understood that seals may be provided to limit air leakage in either of the intake manifolds 10, 50. FIGS. 1–3 illustrate possible seal configurations where radially extending sealing disks 82 extend from the shaft 40 to limit air leakage around blades 46, 48 and around the circumferential surface 84 of the shaft.

Figure 8:
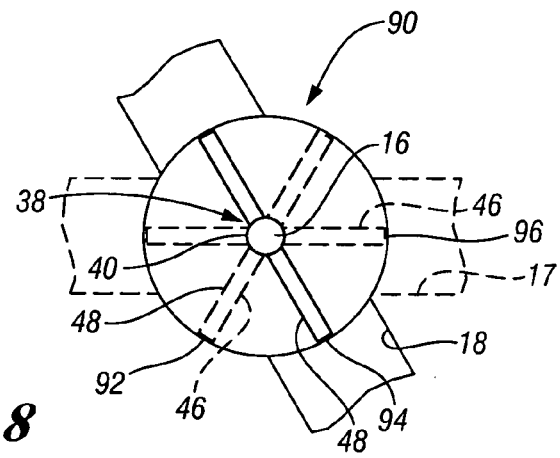
FIG. 8 is a diagram illustrating three mode positions of an alternative control valve wherein the communication passages are angularly offset and the blades are parallel.

FIG. 8 illustrates an alternative embodiment of the invention wherein the communication passages are angularly offset and the blades of the control valve are aligned along the length of the shaft. The figure shows a cross-sectional view similar to those of FIGS. 4–6 but wherein the single figure shows all three mode positions of the control valve. Like numerals are use to indicate components similar to those of the embodiment of FIGS. 4–6.

Referring to FIG. 8, numeral 90 indicates a fragmentary portion of a modified intake manifold 90 which is similar to the embodiment of FIGS. 1–3. The cross-sectional view extends normal to the rotational axis 16 of the valve 38 and to the shaft 40 extending along the axis. The embodiment differs from FIGS. 1–3 in that the longitudinally spaced communication passages 17, 18 in the tubular valve body 15 are not parallel, but angularly offset. Also, the longitudinally spaced control valve blades 46, 48 are longitudinally aligned.

In particular, the first communication passage 17 extends (horizontally in FIG. 8) across the cylindrical center of the valve body 15, while the second communication passage 18 is angularly offset at an angle of 60 degrees clockwise from passage 17. The cross section is taken through the second passage 18, so that this passage is shown by solid lines and the first passage 17, located behind, is shown by hidden (dashed) lines. Additionally, since the first and second blades are axially aligned, the angular positions are the same so that the second blade 48 is seen in the second passage 18 and the first blade 46 is hidden behind the second blade 48. Thus blade 46 is not seen in the figure but its position in the hidden first passage 17 is the same as that of blade 18 which is seen.

The three modes of operation of an engine with the manifold arrangement of FIG. 8 is essentially the same as for manifolds 10 and 50. At low engine speeds the control valve blades 46, 48 (shown in phantom lines with long dashes) are disposed in a first mode position 92 (60 degrees clockwise from horizontal in FIG. 8) in which both the first communication passage 17 and the second passage 18 are blocked. The separate plenums 12, 13, shown in FIGS. 1 and 2, thus remain separated and are tuned to increase engine torque at lower engine speeds.

At medium engine speeds, the valve 38 is rotated 60 degrees counterclockwise to a second mode position 94 in which the second valve blade 48 is shown in solid lines. In this mode position, both valve blades lie parallel with the second communication passage 18 so that the first blade 46 continues to close the first communication passage 17 while the second blade 48 opens the second communication passage 18. The separate plenums are thus communicated through the longer passage 18, which tunes the manifold to enhance engine torque at medium engine speeds.

At higher engine speeds, the valve is again rotated another 60 degrees counterclockwise to a third mode position 96 in which both blades lie horizontal, as shown in FIG. 8, and the first valve blade 46 is shown in hidden lines (with short dashes). In this mode position, both valve blades lie parallel with the first communication passage 17, so that the first blade 46 opens the first communication passage 17 while the second blade 48 again closes the second communication passage 18. The separate plenums are thus communicated through the shorter passage 18 which tunes the manifold to enhance engine torque at higher engine speeds.

While the previously discussed embodiments were directed to a V6 engine and an inline four cylinder engine, it should be understood that the intake manifold may be modified so that the two plenums are associated to other engine arrangements wherein the two plenums are connected to alternately firing cylinder groups as in the previously discussed embodiments.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An intake manifold for use with an internal combustion engine having two groups of cylinders, the intake manifold comprising:

a pair of plenums adapted to receive intake air through separate inlets from at least one throttle body and to discharge the inlet air through separate groups of runners connectable with the two groups of engine cylinders;

first and second communication passages each connecting the two plenums, the passages intersecting an axis adjacent axially spaced locations and adapted for separately tuning the manifold to enhance engine torque at differing engine speeds; and a control valve including an elongated shaft rotatable on the axis and extending axially across the first and second communication passages, the shaft carrying a first blade disposed in the first passage and rotatable with the shaft to control communication through the first passage and the shaft carrying a second blade disposed in the second passage and rotatable with the shaft to control communication through the second passage.

2. An intake manifold as in claim 1 wherein the blades are positioned in the manifold such that in a first mode position, the valve closes both communication passages for operation of the engine in a first tuning mode.

3. An intake manifold as in claim 2 wherein in a second mode position, the valve closes the first passage and opens the second passage for operation of the engine in a second tuning mode.

4. An intake manifold as in claim 3 wherein in a third mode position, the valve opens the first passage and closes the second passage for operation of the engine in a third tuning mode.

5. An intake manifold as in claim 1 wherein the blades of the control valve are angularly offset and the communication passages are positioned such that three tuning modes are provides by rotation of the valve to the three angularly-spaced positions.

6. An intake manifold as in claim 1 wherein the communication passages are angularly offset and the blades are positioned such that three tuning modes are provided by rotation of the valve to three angularly-spaced positions.

7. An intake manifold as in claim 1 wherein the control valve is positioned by a rotatable power actuator.

8. An intake manifold as in claim 1 wherein the first communication passage has a shorter length than the second communication passage.

9. An intake manifold as in claim 1 wherein the first and second blades are separated by a sealing disk extending radially from the shaft and adapted to limit cross flow between the passages.

10. An intake manifold as in claim 1 wherein the shaft has a plurality of sealing disks extending radially from the shaft and adapted to limit air leakage into and out of the passages.

* * * * *